US011117495B2

(12) United States Patent
Heath et al.

(10) Patent No.: US 11,117,495 B2
(45) Date of Patent: Sep. 14, 2021

(54) MOTORIZED SEAT (71) Applicant: Global Interior Solutions, Inc., New Hudson, MI (US)

(72) Inventors: Derek Heath, West Bloomfield, MI (US); Doug Heath, Novi, MI (US)

(73) Assignee: GLOBAL INTERIOR SOLUTIONS, INC., New Hudson, MI (US)

( * ) Notice: Subject to any disclaimer, the term of this patent is extended or adjusted under 35 U.S.C. 154(b) by 0 days.

(21) Appl. No.: 16/779,227

(22) Filed: Jan. 31, 2020

(65) Prior Publication Data

US 2020/0247273 A1    Aug. 6, 2020

Related U.S. Application Data (60) Provisional application No. 62/801,837, filed on Feb. 6, 2019.

(51) Int. Cl.
| | | |
|---|---|---|
| *B60N 2/02* | (2006.01) | |
| *B60N 2/75* | (2018.01) | |
| *B60N 2/829* | (2018.01) | |
| *B60N 2/90* | (2018.01) | |
| *B63B 29/04* | (2006.01) | |

(52) U.S. Cl.
CPC ........... *B60N 2/0232* (2013.01); *B60N 2/753* (2018.02); *B60N 2/767* (2018.02); *B60N 2/829* (2018.02); *B60N 2/995* (2018.02); *B60N 2002/0236* (2013.01); *B63B 2029/043* (2013.01)

(58) Field of Classification Search
CPC .. B60N 2/0232; B60N 2/0228; B60N 2/0224; B60N 2/829; B60N 2/753; B60N 2/767; B60N 2/75; B60N 2/995; B60N 2002/0236; B63B 2029/043
USPC ....................................................... 297/85 M
See application file for complete search history.

(56) References Cited

U.S. PATENT DOCUMENTS

| | | |
|---|---|---|
| 4,619,478 A | 10/1986 | Heimnick et al. |
| 4,984,847 A | 1/1991 | Bedu et al. |
| 5,374,102 A | 12/1994 | Archambault et al. |
| 5,458,399 A | 10/1995 | Gezari et al. |
| 6,154,690 A * | 11/2000 | Coleman ................ A61G 5/006 |
| | | 180/65.1 |
| 7,963,610 B2 | 6/2011 | Barfuss |
| 8,616,643 B2 | 12/2013 | Darbyshire et al. |
| 8,954,239 B2 * | 2/2015 | Piaulet .................. B64D 11/06 |
| | | 701/49 |
| 9,066,596 B2 | 6/2015 | Clark |

(Continued)

FOREIGN PATENT DOCUMENTS

| | | |
|---|---|---|
| CA | 2093072 A1 | 10/1994 |
| DE | 10203563 A1 | 8/2003 |
| EP | 1652505 A2 | 5/2006 |

*Primary Examiner* — Mark R Wendell
(74) *Attorney, Agent, or Firm* — Reising Ethington PC (57) ABSTRACT

A motorized seat that may be used in various marine applications to help improve adjustability and user comfort. In one implementation, a left armrest motor, a right armrest motor, and a footrest motor are selectively controllable and configured to move the left armrest between a left armrest stowed position and a left armrest lowered position, the right armrest between a right armrest stowed position and a right armrest lowered position, and the footrest between a footrest stowed position and a footrest lowered position.

18 Claims, 5 Drawing Sheets

(56) References Cited

U.S. PATENT DOCUMENTS

| | | | | |
|---|---|---|---|---|
| 2013/0113251 A1* | 5/2013 | First | .............. | A47C 31/11 |
| | | | | 297/219.1 |
| 2017/0015422 A1* | 1/2017 | Garing | .............. | B60N 2/995 |
| 2018/0105069 A1* | 4/2018 | Nasca | .............. | B60N 2/0232 |
| 2020/0100594 A1* | 4/2020 | Fietz | .............. | A47C 1/0303 |

* cited by examiner

MOTORIZED SEAT

CROSS-REFERENCE TO RELATED APPLICATION

This application claims priority to U.S. Application Ser. No. 62/801,837 filed on Feb. 6, 2019, the entire contents of which is incorporated by reference in its entirety.

TECHNICAL FIELD

This invention generally relates to seats, and more particularly, to motorized seats for marine applications.

BACKGROUND

Seats in marine applications, such as in boats, yachts, and other watercraft, can be designed to be more adjustable than other vehicle-based seats, given that it is not always necessary for a user to be actively driving. Accordingly, footrests may extend, headrests may be tilted, and armrests can be raised and lowered to facilitate different seat configurations. Providing more selective configurations and efficient transitions between such configurations is desirable.

SUMMARY

In accordance with one embodiment, there is provided a motorized seat, comprising: a seat body having a lower seat area and an upper seat back; a left armrest operably coupled to the seat body, the left armrest having a left armrest motor; a right armrest operably coupled to the seat body, the right armrest having a right armrest motor; and a footrest operably coupled to the seat body, the footrest having a footrest motor, wherein the left armrest motor, the right armrest motor, and the footrest motor are selectively controllable and configured to move the left armrest between a left armrest stowed position and a left armrest lowered position, the right armrest between a right armrest stowed position and a right armrest lowered position, and the footrest between a footrest stowed position and a footrest lowered position.

In accordance with another embodiment, there is provided a motorized seat, comprising: a seat body having a lower seat area and an upper seat back, wherein the upper seat back has a base portion configured to be attached to the lower seat portion, the base portion having a first seat back width between a left side stow surface and a right side stow surface, and a shoulder support portion having a second seat back width between a left side extension surface and a right side extension surface, wherein the left side extension surface forms a left upper stow surface and the right side extension surface forms a right upper stow surface; a left motorized armrest having a terminal end, a pivot end, an inboard side, an outboard side, a rest side, and a stow-back side, wherein a terminal end of the left motorized armrest is configured to face the left upper stow surface; and a right motorized armrest having a terminal end, a pivot end, an inboard side, an outboard side, a rest side, and a stow-back side, wherein the terminal end of the right motorized armrest is configured to face the right upper stow surface.

DRAWINGS

Preferred example embodiments will hereinafter be described in conjunction with the appended drawings, wherein like designations denote like elements, and wherein.

DESCRIPTION

The motorized seat embodiments disclosed herein may be used in various marine applications to help improve adjustability and user comfort. The use of application specific, individually controllable motors for each armrest and the footrest, and a headrest in some embodiments, can improve seat functionality. Further, given that the seat is used on a boat or watercraft, the motorized armrests and/or footrests are water-resistant while providing more efficient usability for various scenarios such as driving, resting, activities such as fishing, etc.

Figure 1:
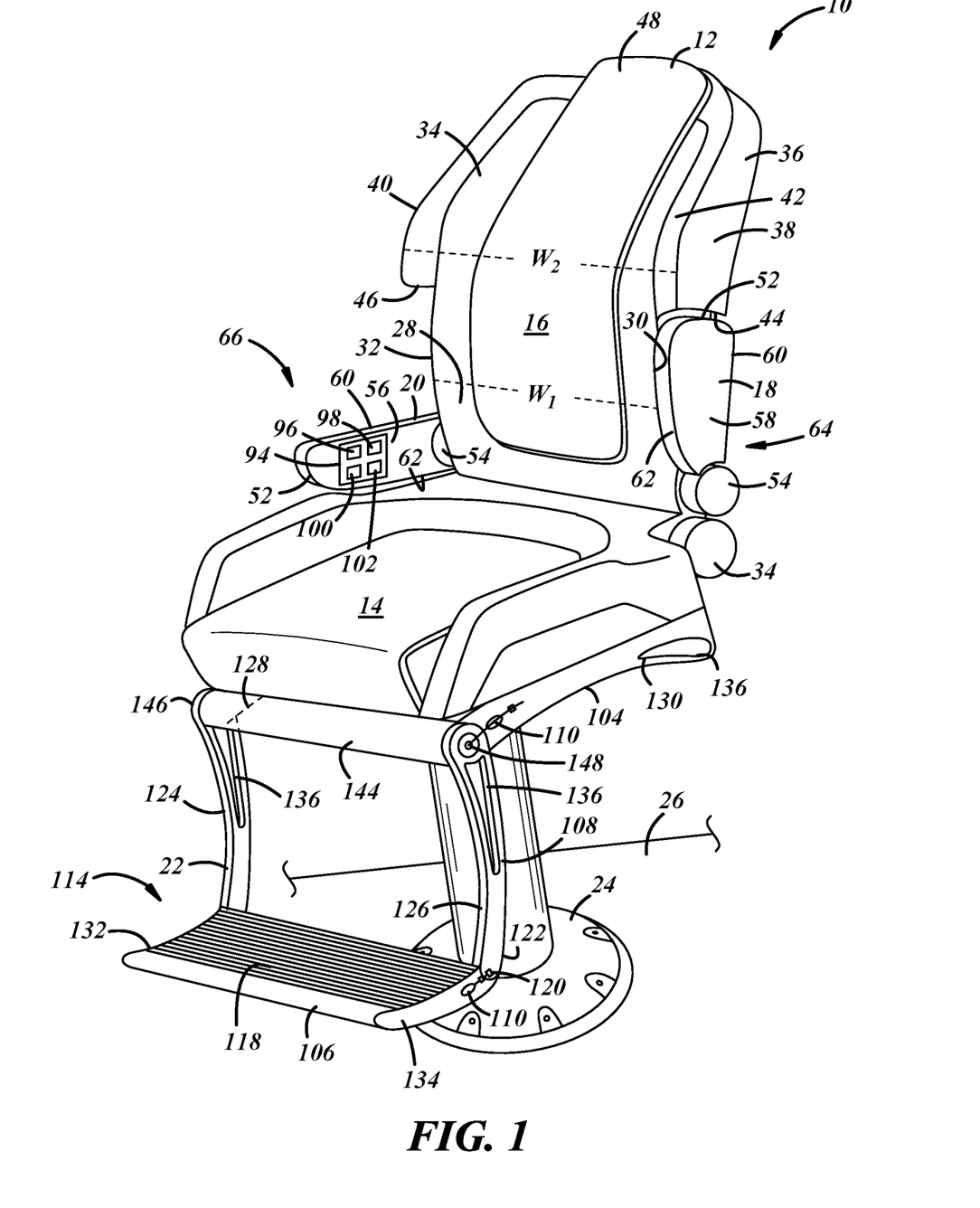
FIG. 1 is a perspective view of a motorized seat according to one embodiment.

FIG. 1 illustrates the motorized seat 10 in accordance with one embodiment. The seat includes a seat body 12 having a lower seat area 14 and an upper seat back 16. A motorized left armrest 18 is operably coupled to the seat body 12, and a motorized right armrest 20 is operably coupled to the seat body 12. A motorized footrest 22 is also coupled to the seat body 12. The left armrest 18, the right armrest 20, and the footrest 22 are selectively controllable and configured to move in various positions to promote user comfort and stowing efficiency. The motorized seat 10 in FIG. 1 is a yacht chair, and as detailed below, can include different features to enhance water resistance and performance characteristics in marine-based applications. For example, a seat base or pedestal base 24 can securely attach the seat 10 the boat deck 26. The seat body 12 may be rotatable relative to the seat base 24 in some implementations. Other features are detailed below and certainly possible.

As described above, the seat body 12 has a lower seat area 14 and an upper seat back 16. The upper seat back 16 includes a base portion 28 configured to be attached to the lower seat area 14. The base portion 28 has a first seat back width $W_1$ between a left side stow surface 30 and a right side stow surface 32 that generally define the sides of the seat 10 when the armrests 18, 20 are lowered. The base portion 28 may be attached to the lower seat area 14, or in some embodiments, the attachment may be integral as it is possible for the lower seat area 14 and the base portion 28 of the seat body 12 to be a unitary piece. In an advantageous embodiment, the base portion 28 is rotatably attached to the lower seat area 14 so as to allow rotation of the upper seat back 16 relative to the lower seat area 14. This embodiment can provide user adjustability of the posture of the upper seat back 16 and allow for the seat 10 to be in a more reclined position than what is illustrated. The rotatable attachment 34 may be motorized, such as using one of the motors described below or a different motor, such that the user can adjust the posture of the seat 10 with a switch or other electronic means.

The upper seat back 16 also includes a shoulder support portion 36. The shoulder support portion 36 has a second seat back width $W_2$ between a left side extension surface 38 and a right side extension surface 40. The left side extension surface 38 and the right side extension surface 40 of the shoulder support portion 36 also generally define the sides of seat 10. The shoulder support portion 36 can partially conform to a user's shoulders, by including, for example, a user extending projection 42 which projects toward the user to provide additional support, while the base portion 28 can provide lumbar support to the user. Further, the left side extension surface 38 and the right side extension surface 40, given that $W_2$ is greater than $W_1$, generally help form a left upper stow surface 44 and a right upper stow surface 46, respectively. In some embodiments, the location of the left upper stow surface 44 and the right upper stow surface 46 generally define the demarcation between the base portion 28 and the shoulder support portion 36.

FIG. 1 illustrates the seat body 12 and armrests 18, 20 with a covering 48. The covering 48 may be made from leather, a synthetic leather such as polyurethane, or another operable material. In an advantageous embodiment, the covering 48 is water-resistant which is preferable for marine-based applications. This water-resistance may be an inherent feature of the covering material itself, or in some embodiments, a water-resistant coating may be applied to the covering layer 48. A foam or cushioning layer (not shown) may be included under the covering for user comfort. The foam or cushioning layer is a molded polyurethane according to one embodiment. The covering and foam layer cover a frame 50 which is illustrated in the view of the right armrest 20 in FIG. 2 and the partial view of the left armrest 18 in FIG. 3.

Figure 2:
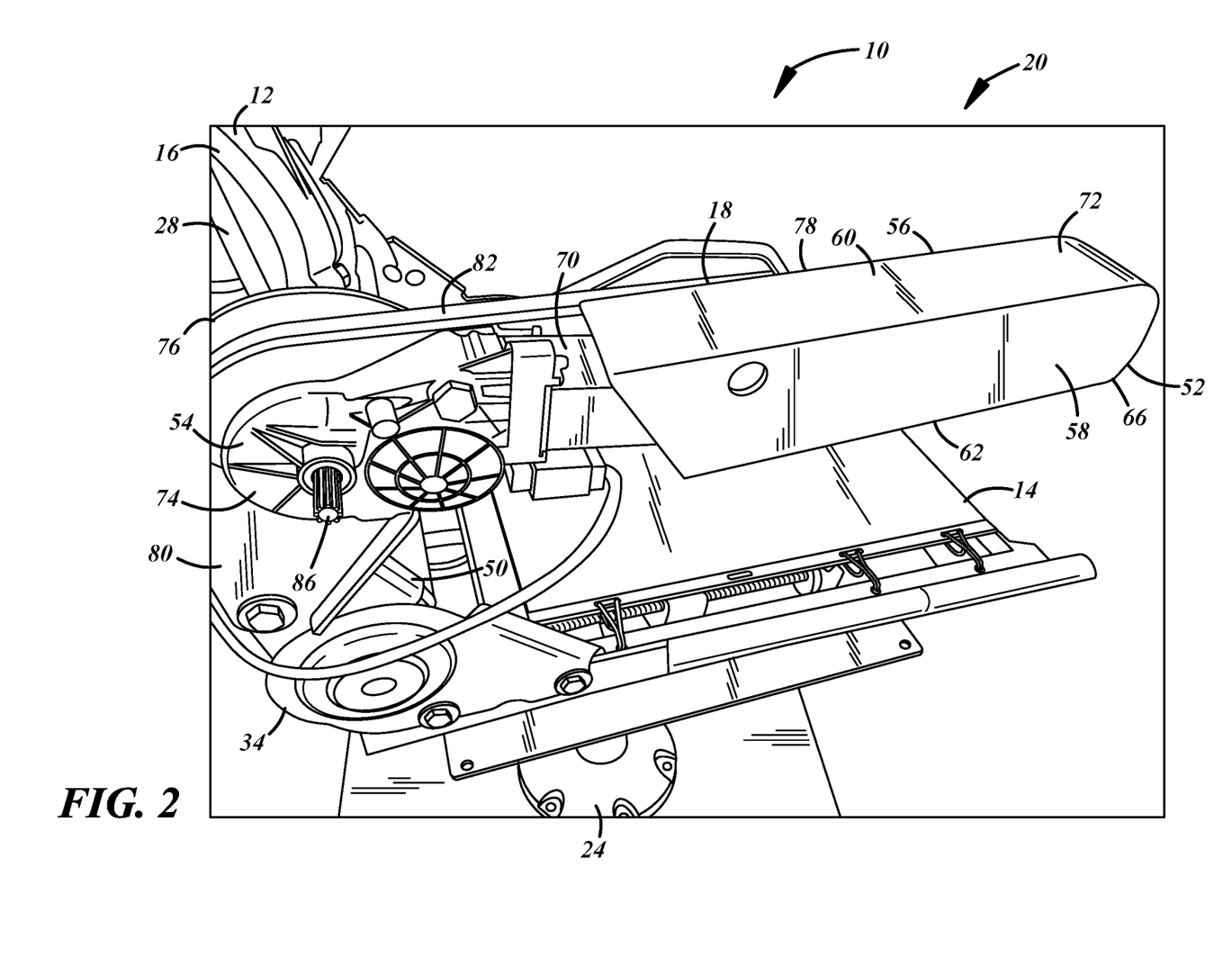
FIG. 2 shows the inboard side of the left armrest of the motorized seat of FIG. 1 with the covering removed.

The left armrest 18 and the right armrest 20 are mounted on the seat body 12, and can be mounted at the left side stow surface 30, and the right side stow surface 32, respectively, as shown in FIG. 1. With reference to FIGS. 1 and 2, each armrest 18, 20 includes a terminal end 52, a pivot end 54, an inboard side 56, and outboard side 58, a rest side 60, and a stow-back side 62. In an advantageous embodiment, the armrests 18, 20 are mirror images of each other, and accordingly parts and components discussed in conjunction with one armrest 18, 20 may also be applicable to the other of the armrests 18, 20. In FIG. 1, the left armrest 18 is shown in a stowed position 64 and the right armrest 20 is shown in a lowered position 66. In the stowed position 64, the terminal end 52 of the left armrest 18 is located directly adjacent to and contacts the left upper stow surface 44. Additionally, the inboard side 56 of the left armrest 18 is located directly adjacent to and contacts the left side stow surface 30. In the lowered position 66, the terminal end 52 of the right armrest is pivoted at the pivot end 54 from its stowed position to extend out from the base portion 28 of the upper seat back 16 (e.g., about 80-95°). The lowered position 66 allows a user to rest his or her arm on the rest side 60 of the armrest 20 if desired.

Figure 3:
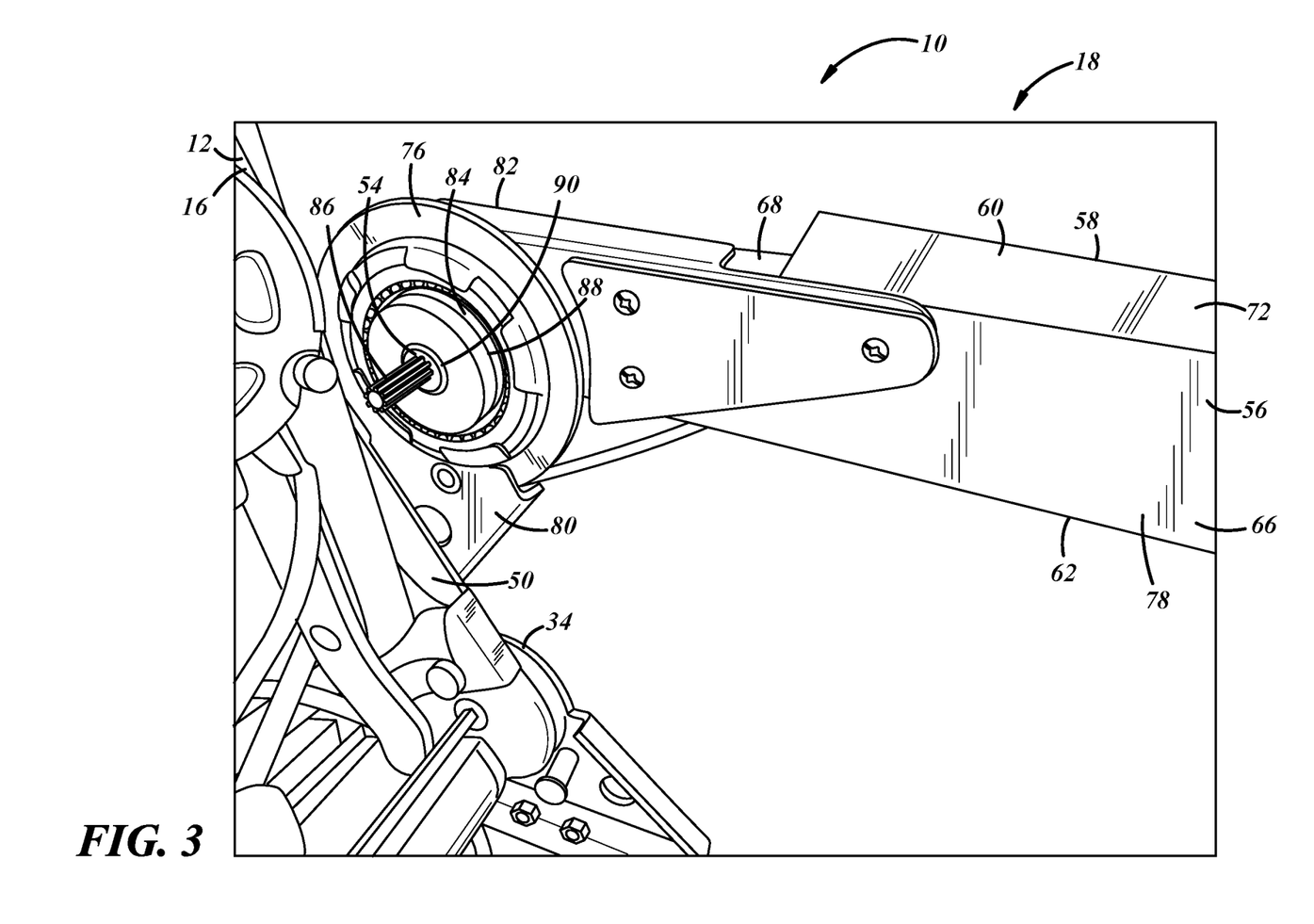
FIG. 3 shows the outboard side of the right armrest of the motorized seat of FIGS. 1 and 2 with the covering removed.

To facilitate movement between the stowed position 64 and the lowered position 66, the left armrest 18 includes a left armrest motor 68, and the right armrest 20 includes a right armrest motor 70. The motors 68, 70 may include a motor housing 72. The motor housing 72 may be comprised of a composite substrate (e.g., acrylonitrile butadiene styrene (ABS) or molded carbon fiber). The motor housing 72 may extend further to shield more of the motor 68, 70, and may ultimately be covered in a foam layer and the covering 48 as discussed. The armrest motor 68, 70 is advantageously a DC motor that includes a transmission 74. The transmission 74 is attached to a pivot bracket 76. The pivot bracket 76 is attached to the frame 50 and an armrest frame member 78 via stationary portion 80 and rotating portion 82, respectively. In the illustrated embodiment, the pivot bracket 76 is a stamped steel bracket with the stationary portion 80 being bolted to the frame 50, although other material types and configurations are certainly possible. The transmission 74 helps facilitate rotational movement in conjunction with a gear mechanism 84, as shown in FIG. 3. The gear mechanism 84 helps increase torque applied to a rotating shaft 86 via toothed gear rings 88, 90. Accordingly, the armrest motor 68, 70 is configured to move the armrest 18, 20 between the stowed position 64 and the lowered position 66 via movement of the pivot bracket 76, transmission 74, and gear mechanism 84.

A user can selectively control each of the armrests 18, 20 with the separate motors 68, 70. Wiring 92 connects each motor 68, 70 to a control panel 94 (see wiring 92 in FIGS. 2 and 3, and the control panel 94 schematically illustrated in FIG. 1). The control panel 94 can be an area in which four switches are located, such as the left armrest switch 96, the right armrest switch 98, the footrest switch 100, and the reclining switch 102. In other embodiments, there may be more or less switches, there may not be distinct switches, or there could be other types of user input devices as a substitute for or in addition to rocker switches (e.g., knobs, sliders, a touch screen panel, etc.). In embodiments having a headrest, for example, a separate switch may also be provided in the control panel 94 for control of the headrest. Or, the reclining switch 102 or another switch may be used to control headrest functionality. Further, although the control panel 94 is illustrated as being on the inboard side 56 of the right armrest 20, other locations are certainly possible. For example, the control panel 94 could be located on a boat dash panel or the like, as the motors 68, 70 are ultimately powered via the power system of the boat. In another embodiment, the left armrest switch 96 is located on the left armrest 18, the right armrest switch 98 is located on the right armrest 20, and the footrest switches 100, 102 are located on the lower seat area 14. A wiring harness can be used to attach the switches 96-102 or another controller to the vehicle's power system.

In an advantageous embodiment, the seat 10 also includes a motorized footrest 22. The motorized footrest 22 includes a mounting frame 104, a first footrest portion 106, and a second footrest portion 108. The mounting frame 104 attaches the footrest 22 to the lower seat area 14. In some embodiments, the mounting frame 104 can be more integrated with the lower seat area 14 (e.g., the mounting frame 104 can structurally support the seat area 14 or be included within covering 48, to cite a few examples). The mounting frame 104 may consist of stamped steel rails that have one or more horizontally extending support rails or platforms that are located along the underside of the lower seat area 14.

The first footrest portion 106 attaches to the mounting frame 104 via the second footrest portion 108 and a belt or chain drive 110. The first footrest portion 106 can be selectively lowered from and between a footrest stowed position 112 (see FIG. 4) and a footrest lowered position 114 (see FIGS. 1 and 5). This can be accomplished via a first footrest motor 116, which is schematically illustrated along the underside of the lower seat area 14 in FIG. 4. The first footrest motor 116 can be wired to the footrest switch 100 of control panel 94 to allow the user to raise and lower a ribbed foot interface surface 118. A ribbed foot interface surface 118 having a plurality of horizontally extending ribs or grooves is desirable in marine applications, as it can promote the removal of water from the area, although other foot interface types, configurations, etc., are certainly possible. The belt or chain drive system 110 drives a first gear mechanism 120 at a first pivot point 122 between each rail 124, 126 of the second footrest portion 108 (only the first rail 124 is shown in the side views of FIGS. 4-6, with both the first and second rails 124, 126 being shown in FIG. 1). In the figures, the illustrated footrests 22 in FIGS. 1 and 4-6 have different implementations for the rails 124, 126 of the second footrest portion 108, as well as the rails 128, 130 of the mounting portion 104 and the sides 132, 134 of the first footrest portion 106. For example, alternately configured recesses 136 may be provided for design purposes or to facilitate water or air flow therethrough.

Figure 4:
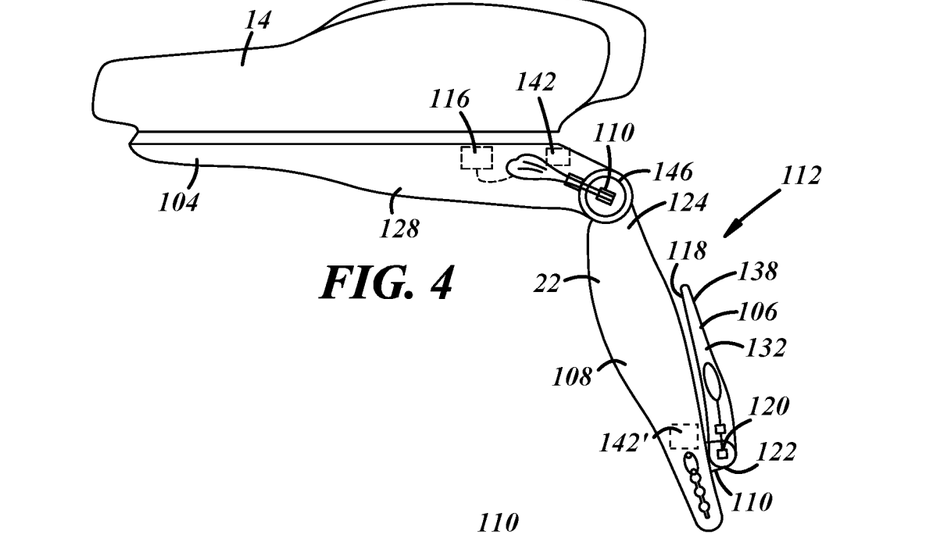
FIG. 4 illustrates a footrest of a motorized seat in accordance with one embodiment, the footrest being in a footrest stowed position.
Figure 5:
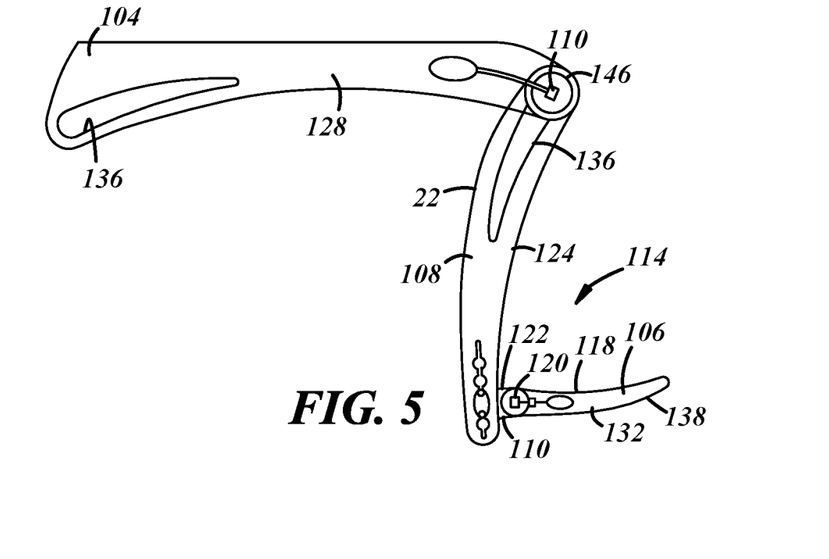
FIG. 5 illustrates a footrest of a motorized seat in accordance with one embodiment, the footrest being in a footrest lowered position.

The footrest stowed position 112 illustrated in FIG. 4 brings the footrest interface portion 118 up such that it faces away from a user's legs, and an underside portion 138 faces toward the back of the user's legs. The footrest lowered position 114 illustrated in FIGS. 1 and 5 involves lowering of the first footrest portion 106 via the motor 116, which is advantageously a DC motor, as with the motorized armrests 18, 20. The motor 116, via belt or chain drive 110, is configured to rotate the first footrest portion 106 relative to the second footrest portion 108 at the first pivot point 122 such that it is oriented (e.g., about 80-95°) with respect to the second footrest portion 108.

Figure 6:
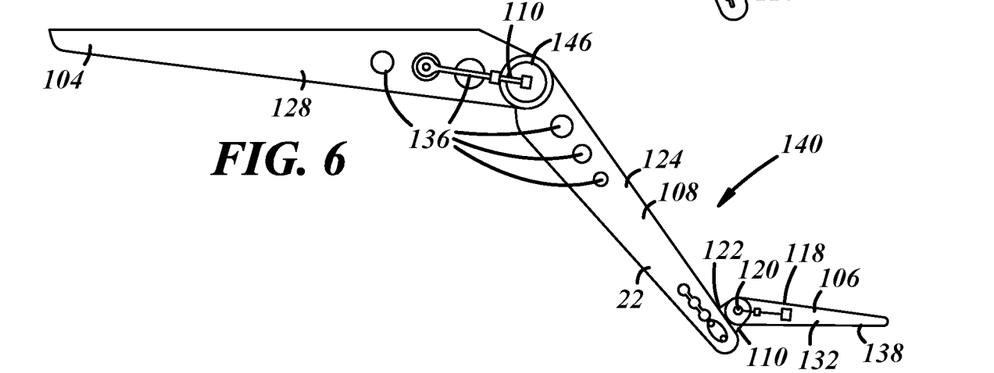
FIG. 6 illustrates a footrest of a motorized seat in accordance with one embodiment, the footrest being in a footrest extended lower position.

FIG. 6 illustrates an extended lower position 140 for the footrest 22. For the extended lower position 140, a second footrest motor 142 (shown schematically in FIG. 4, along with another alternate mounting location as designated by 142') can be configured to move the second footrest portion 108 with respect to the mounting portion 104. The rails 124, 126 of the second footrest portion 108 are connected via a shaft 144 (see FIG. 1) and gear mechanisms 146, 148. In one embodiment, the shaft 144 is an extruded steel shaft. As with the armrests 18, 20, the second footrest motor 142 can facilitate movement between the mounting portion 104 and the second footrest portion 108 with two pivot gears having their stationary portions mounted to the rails 128, 130 of mounting portion 104 and the rotating portions mounted to the rails 124, 126 of the second footrest portion 108. In an advantageous embodiment, the second footrest motor 142 is also the motor that facilitates reclining of the upper seat back 16 relative to the lower seat area 14. Accordingly, the reclining switch 102 of the control panel 94 may be used to facilitate operation of the second footrest motor 142. In another embodiment, an additional separate motor is used for reclining the upper seat back 16 relative to the lower seat area 14. In the extended lower position 140, the second footrest portion 108 can be rotated respect to the mounting portion 104 (e.g., about 110-180°). Additionally, the first footrest motor 116 can move the first footrest portion 106 so that it is further extended (e.g., rotated about 110-180° with respect to the second footrest portion 108). The first footrest motor 116 and the second footrest motor 142 can then be used to move the footrest 22 back to the footrest lowered position 114 and the footrest stowed position 112.

The second footrest motor 142 can be mounted in any operable location. For example, the second footrest motor 142' shown in FIG. 4 can be mounted closer to the first footrest portion 106 (teachings relating to the second footrest motor 142 may also be applicable to the second footrest motor 142' and vice versa). When mounted closer to the first footrest portion 106, the second footrest motor 142' may be contained within a housing, such as a clamshell style housing, near the pivot point between the first footrest portion 106 and the second footrest portion 108. Additionally, the second footrest motor 142' can be mounted with its own transmission in the housing such that the separate belt or chain drive 110 is not required. One or more additional shafts and/or rails may be included to facilitate movement of the first footrest portion 106 via the second footrest motor 142' (e.g. to connect to pivot points, provide additional pivot points, etc.).

Figure 7:
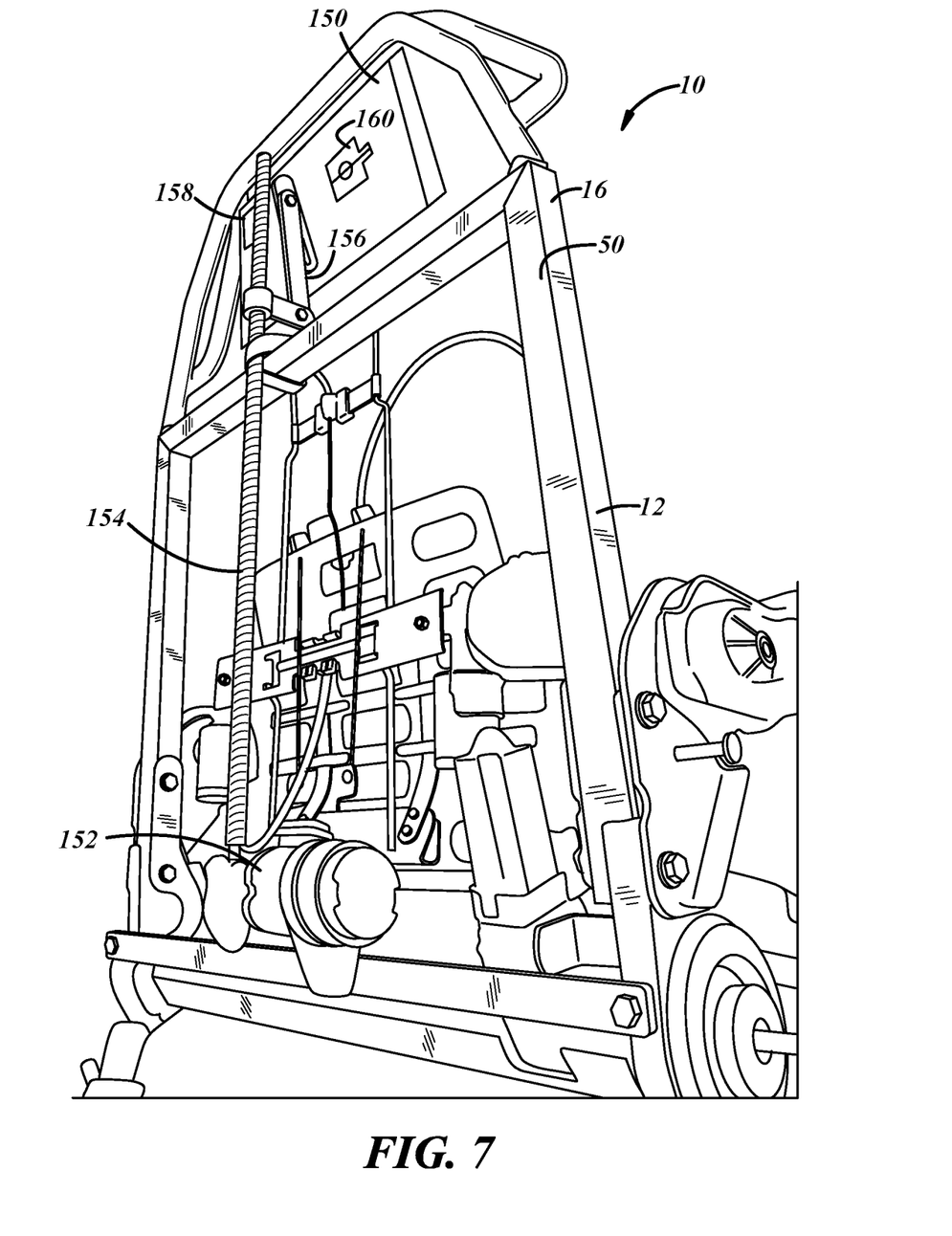
FIG. 7 illustrates a headrest of a motorized seat in accordance with one embodiment.

FIG. 7 shows part of the frame 50 of another embodiment of a motorized seat 10 (some reference numerals have been omitted in this figure for clarity purposes, but teachings relating to the other illustrated and discussed embodiments are also applicable to this embodiment; and also, the other illustrated and discussed embodiments may have one or more of the features described with respect to this embodiment). This embodiment includes a headrest 150, or more particularly, a motorized headrest that is operably coupled to the seat body 12 at the upper seat back 16. The headrest 150 has a headrest motor 152. A vertically extending shaft 154 extends from the motor 152 to the headrest 150. Headrest 150 is attached to the shaft 154 via lever arm 156. Linear bearings 158, 160 may also be provided to help facilitate movement of the headrest 150. The motor 152 may be a DC motor as described previously, and may be used to facilitate various tilting motions, pivoting motions, linear motions, etc., depending on the desired implementation. Control of the headrest 150 and motor 152 may be accomplished via a switch or the like on the control panel 94, as previously described. As with the other components of the motorized seat 10, the headrest 150 and/or motor 152, along with the other illustrated components, may be covered with a foam and/or covering layer.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:
1. A motorized seat, comprising:
 a seat body having a lower seat area and an upper seat back;
 a left armrest operably coupled to the seat body, the left armrest having a left armrest motor;
 a right armrest operably coupled to the seat body, the right armrest having a right armrest motor; and a footrest operably coupled to the seat body, the footrest having a footrest motor,
wherein the left armrest motor, the right armrest motor, and the footrest motor are selectively controllable and configured to move the left armrest between a left armrest stowed position and a left armrest lowered position, the right armrest between a right armrest stowed position and a right armrest lowered position, and the footrest between a footrest stowed position and a footrest lowered position, and wherein the left armrest motor connects to a left armrest gear mechanism configured to rotate the left armrest between the left armrest stowed position and the left armrest lowered position and/or the right armrest motor connects to a right armrest gear mechanism configured to rotate the right armrest between the right armrest stowed position and the right armrest lowered position.

2. The motorized seat of claim 1, further comprising a second footrest motor configured to move the footrest between a footrest lowered position and a footrest extended lower position.

3. The motorized seat of claim 2, wherein the footrest motor is configured to move a first footrest portion and the second footrest motor is configured to move a second footrest portion.

4. The motorized seat of claim 1, wherein the left armrest motor includes a transmission that is attached to a pivot bracket, and the transmission is configured to help facilitate rotational movement of the left armrest in conjunction with the left armrest gear mechanism.

5. The motorized seat of claim 1, wherein the right armrest motor includes a transmission that is attached to the pivot bracket, and the transmission is configured to help facilitate rotational movement of the right armrest in conjunction with the right armrest gear mechanism.

6. The motorized seat of claim 1, wherein the seat body, the left armrest, and the right armrest include a water-resistant covering.

7. The motorized seat of claim 1, wherein the footrest includes a first footrest portion and a second footrest portion, wherein the second footrest portion is attached to a mounting frame.

8. The motorized seat of claim 7, wherein the second footrest portion includes first and second rails, with each of the first and second rails having recesses extending therethrough.

9. The motorized seat of claim 8, wherein the footrest motor is configured to rotate the first footrest portion relative to the second footrest portion via a drive system such that the first footrest portion is oriented between 80-95° with respect to the second footrest portion.

10. The motorized seat of claim 1, further comprising a headrest operably coupled to the seat body, the headrest having a headrest motor.

11. A motorized seat, comprising:
a seat body having a lower seat area and an upper seat back;
a left armrest operably coupled to the seat body, the left armrest having a left armrest motor;
a right armrest operably coupled to the seat body, the right armrest having a right armrest motor; and
a footrest operably coupled to the seat body, the footrest having a footrest motor, wherein the left armrest motor, the right armrest motor, and the footrest motor are selectively controllable and configured to move the left armrest between a left armrest stowed position and a left armrest lowered position, the right armrest between a right armrest stowed position and a right armrest lowered position, and the footrest between a footrest stowed position and a footrest lowered position, and wherein a second footrest motor is configured to move the footrest between a footrest lowered position and a footrest extended lower position, wherein the second footrest motor is configured to recline the upper seat back of the seat body.

12. A motorized seat for a marine vehicle, comprising:
a seat body having a lower seat area and an upper seat back;
a left armrest operably coupled to the seat body, the left armrest having a left armrest motor;
a right armrest operably coupled to the seat body, the right armrest having a right armrest motor; and
a footrest operably coupled to the seat body, the footrest having a footrest motor, wherein the left armrest motor, the right armrest motor, and the footrest motor are selectively controllable and configured to move the left armrest between a left armrest stowed position and a left armrest lowered position, the right armrest between a right armrest stowed position and a right armrest lowered position, and the footrest between a footrest stowed position and a footrest lowered position, and wherein the footrest includes a first footrest portion and a second footrest portion, wherein the first footrest portion has a ribbed foot interface surface having a plurality of ribs extending across the ribbed foot interface surface.

13. A motorized seat, comprising:
a seat body having a lower seat area and an upper seat back, wherein the upper seat back has a base portion configured to be attached to the lower seat portion, the base portion having a first seat back width between a left side stow surface and a right side stow surface, and a shoulder support portion having a second seat back width between a left side extension surface and a right side extension surface, wherein the left side extension surface forms a left upper stow surface and the right side extension surface forms a right upper stow surface, wherein the second seat back width is greater than the first seat back width;
a left motorized armrest having a terminal end, a pivot end, an inboard side, an outboard side, a rest side, and a stow-back side, wherein a terminal end of the left motorized armrest is configured to face the left upper stow surface; and
a right motorized armrest having a terminal end, a pivot end, an inboard side, an outboard side, a rest side, and a stow-back side, wherein the terminal end of the right motorized armrest is configured to face the right upper stow surface.

14. The motorized seat of claim 13, wherein the inboard side of the left motorized armrest rest is configured to face the left side stow surface.

15. The motorized seat of claim 13, wherein the inboard side of the right motorized armrest rest is configured to face the right side stow surface.

16. The motorized seat of claim 13, further comprising a motorized footrest operably coupled to the seat body.

17. The motorized seat of claim 13, further comprising a motorized headrest operably coupled to the seat body.

18. The motorized seat of claim 13, wherein the seat body has a water-resistant material covering that is leather-based or polyurethane-based.

* * * * *